(12) United States Patent
Kalochairetis et al.

(10) Patent No.: US 10,724,536 B2
(45) Date of Patent: Jul. 28, 2020

(54) FAN

(71) Applicant: ROLLS-ROYCE plc, London (GB)

(72) Inventors: Antonios Kalochairetis, Derby (GB); Gabriel Gonzalez-Gutierrez, Derby (GB)

(73) Assignee: Rolls-Royce plc, London (GB)

( * ) Notice: Subject to any disclaimer, the term of this patent is extended or adjusted under 35 U.S.C. 154(b) by 194 days.

(21) Appl. No.: 15/898,305

(22) Filed: Feb. 16, 2018

(65) Prior Publication Data

US 2018/0238342 A1 Aug. 23, 2018

(30) Foreign Application Priority Data

Feb. 20, 2017 (GR) .............................. 20170100075

(51) Int. Cl.
*F04D 29/34* (2006.01)
*F04D 29/32* (2006.01)
(Continued)

(52) U.S. Cl.
CPC ............... *F04D 29/34* (2013.01); *F01D 5/10* (2013.01); *F01D 5/16* (2013.01); *F01D 5/3007* (2013.01); *F01D 5/323* (2013.01); *F01D 5/326* (2013.01); *F02K 3/06* (2013.01); *F04D 29/327* (2013.01); *F04D 29/666* (2013.01); *F04D 29/668* (2013.01); *F05D 2220/32* (2013.01);
(Continued)

(58) Field of Classification Search
CPC ..... F01D 5/10; F01D 5/16; F01D 5/30; F01D 5/32; F01D 5/3007; F01D 5/3015; F01D 5/3053; F01D 5/323; F01D 5/326; F01D 25/06; F04D 29/34; F04D 29/327; F04D 29/388; F04D 29/666; F04D 29/668; F02K 3/06; F05D 416/248; F05D 2220/32; F05D 2220/36; F05D 2240/90; F05D 2260/30; F05D 2260/961; F05D 2260/96
USPC ............................................... 416/219 R, 248
See application file for complete search history.

(56) References Cited

U.S. PATENT DOCUMENTS 544,336 A 8/1895 Williams
3,400,912 A 9/1968 Carta et al.
(Continued)

FOREIGN PATENT DOCUMENTS

EP 1752610 2/2007
EP 1995468 11/2008
(Continued)

OTHER PUBLICATIONS

Great Britain Search Report dated Aug. 4, 2017 issued in GB Patent Application No. 1704832.3.
(Continued)

*Primary Examiner* — Christopher Verdier
(74) *Attorney, Agent, or Firm* — Simpson & Simpson, PLLC

(57) ABSTRACT

A fan for a gas turbine engine, the fan comprising a first set of fan blades, each fan blade comprising a root and an axial retention feature provided on the root at a first position, and a second set of fan blades, each fan blade comprising a root and an axial retention feature provided on the root at a second position. Relative to the respective blade on which the respective retention feature is provided, the first position is different to the second position.

3 Claims, 6 Drawing Sheets

(51) Int. Cl.
*F02K 3/06* (2006.01)
*F01D 5/10* (2006.01)
*F01D 5/30* (2006.01)
*F01D 5/16* (2006.01)
*F01D 5/32* (2006.01)
*F04D 29/66* (2006.01)

(52) U.S. Cl.
CPC ...... *F05D 2220/36* (2013.01); *F05D 2240/90* (2013.01); *F05D 2260/30* (2013.01); *F05D 2260/96* (2013.01); *F05D 2260/961* (2013.01)

(56) References Cited

U.S. PATENT DOCUMENTS

| | | | |
|---|---|---|---|
| 4,527,952 A * | 7/1985 | Forestier | F01D 5/323 |
| | | | 416/220 R |
| 5,443,366 A | 8/1995 | Knott | |
| 5,522,702 A * | 6/1996 | Kemsley | F01D 5/323 |
| | | | 416/2 |
| 6,102,664 A | 8/2000 | Nguyen | |
| 8,961,141 B2 | 2/2015 | Anderson et al. | |
| 2009/0053065 A1* | 2/2009 | Oka | F01D 5/3007 |
| | | | 416/220 R |
| 2013/0052026 A1* | 2/2013 | Anderson | F01D 5/326 |
| | | | 416/220 R |
| 2016/0108744 A1* | 4/2016 | Locatelli | F01D 5/147 |
| | | | 416/214 A |
| 2017/0175761 A1* | 6/2017 | Schwarz | F02C 7/36 |
| 2018/0087388 A1* | 3/2018 | Kalochairetis | F01D 5/3046 |

FOREIGN PATENT DOCUMENTS

| | | | | |
|---|---|---|---|---|
| EP | 2511478 A1 * | 10/2012 | | F01D 5/282 |
| EP | 2565384 | 3/2013 | | |
| EP | 3181824 | 6/2017 | | |
| GB | 2299834 A * | 10/1996 | | F01D 5/02 |
| JP | H10299407 | 11/1998 | | |

OTHER PUBLICATIONS

European Search Report dated May 28, 2018, issued in EP Patent Application No. 18152885.

* cited by examiner

FAN

CROSS-REFERENCE TO RELATED APPLICATIONS

This specification is based upon and claims the benefit of priority from Greek Patent Application Number 20170100075 filed on 20 Feb. 2017, the entire contents of which are incorporated herein by reference.

BACKGROUND

1. Field of the Disclosure

The present disclosure concerns a fan for a gas turbine engine and/or a gas turbine engine.

2. Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core.

The fan includes a plurality of fan blades arranged around a disc. The blades may be integrally formed with the disc or the blades and disc may be formed separately, and a blade root of the blades may be received in a complimentary slot in the disc. The blade root and slot of the disc may have any suitable shape, but are often dovetail shaped.

Engagement of the slot and the root of the blade retains the fan blade in position with respect to the disc in a radial and circumferential direction. However, to retain the fan blade in an axial direction an additional retention arrangement is needed. An example of such a retention arrangement, that can also transfer loads to the disc in extreme events such as bird strike or foreign object impact, is explained in detail in U.S. Pat. No. 5,443,366 which is incorporated herein by reference.

SUMMARY

According to an aspect there is provided a fan for a gas turbine engine, the fan comprising a first set of fan blades. Each fan blade of the first set comprises a root and an axial retention feature provided on the root at a first position. The fan further comprises a second set of fan blades. Each fan blade of the second set comprises a root and an axial retention feature provided on the root at a second position. Relative to the respective blade on which the respective retention feature is provided, the first position is different to the second position.

The first position may be at a different relative chordal position to the second position.

The first position may be proximal to a leading edge of the respective fan blade. The second position may be proximal to a trailing edge of the respective fan blade.

One of the first or second positions may be provided on a pressure side of the respective blade and the other of the second or first position may be provided on the suction side of the respective blade.

A plurality of retention features may be provided on each blade. At least one of the retention features may be on a pressure side of the respective blade and at least one of the retention features may be provided on a suction side of the respective blade.

The first set of fan blades may comprise two retention features provided on a pressure side of the blade and one retention feature provided on a suction side of the blade. The second set of fan blades may comprise two retention features provided on a suction side of the blade and one retention feature provided on a pressure side of the blade.

One of the two retention features provided on the pressure side of each of the blades of the first set of blades may be provided proximal to the leading edge and the other may be provided proximal to the trailing edge. One retention feature provided on the suction side of the blade may be provided in a mid-region between the leading and trailing edge of the blade. One of the two retention features that may be provided on the suction side of each of the blades of the second set of blades may be provided proximal to the leading edge and the other may be provided proximal to the trailing edge. One retention feature provided on the pressure side of the blade may be provided in a mid-region between the leading and trailing edge of the blade.

The retention feature provided in the mid-region may be provided mid-way between the leading edge and the trailing edge.

The first set of fan blades and the second set of fan blades may be arranged to alternate circumferentially around the fan.

The fan blades may be mounted to a disc via a disc slot and the disc slot may comprise a circumferentially extending groove. The retention feature may be an integrally formed protrusion provided on the root of the respective blade, and the protrusion may be received in a groove of a respective disc slot.

The protrusion may protrude from a flank of the blade root.

The protrusions may extend in a chordwise direction by approximately 5 to 10% of the length of the blade root.

The protrusion may have a substantially rectangular cross section with rounded corners.

The axial retention feature of the first set of blades may be a different size or shape to the axial retention feature of the second set of blades. For example, the retention features of the first set of blades may have a different volume or mass (e.g. a larger volume or mass) than the retention feature of the second set of blades. For example, when the retention feature is a protrusion, the chordal length of the protrusion on the first set of blades may be different to the chordal length of the protrusion on the second set of blades.

The axial retention feature of the first set of blades may be larger than the axial retention features of the second set of blades.

According to an aspect there is provided a fan for a gas turbine engine, the fan comprising a first set of fan blades, each of the fan blades of the first set comprising an axial retention feature proximal to a leading edge of the fan blade. The fan further comprising a second set of fan blades, each of the fan blades of the second set comprising an axial retention feature proximal to a trailing edge of the fan blade.

The fan may comprise one or more features of the fan of the previous aspect.

According to an aspect there is provided a fan for a gas turbine engine, the fan comprising a first set of fan blades, each of the fan blades of the first set comprising one or more retention features on a pressure side and a suction side of a root of the blade, and wherein more retention features are provided on the pressure side than on the suction side of the blades of the first set. The fan further comprising a second set of fan blades, each of the fan blades of the second set comprising one or more retention features on a pressure side and a suction side of a root of the blade, and wherein more retention features are provided on the suction side than on the pressure side of the blades of the second set.

The fan may comprise one or more features of the fan of the previous aspect.

According to an aspect there is provided a gas turbine engine comprising the fan according to any one of the previous aspects.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DRAWINGS

Figure 1:
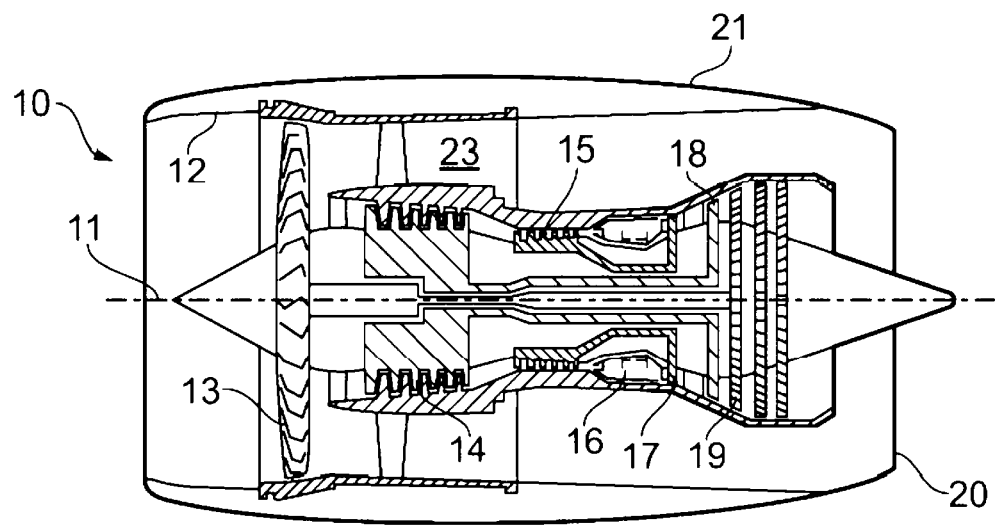
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 23 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
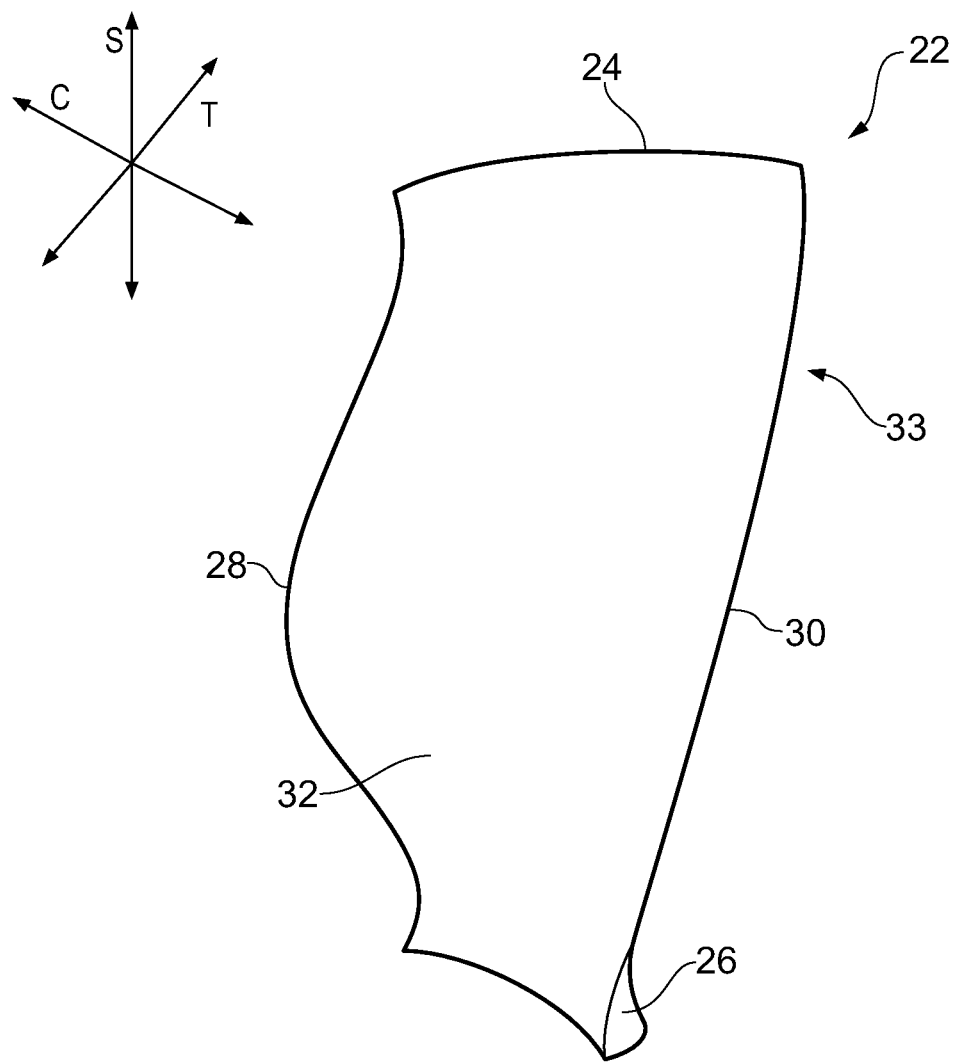
FIG. 2 is a schematic perspective view of a fan blade.

The fan 13 includes a plurality of fan blades 22 extending from a disc, which may also be considered to be a hub. Referring to FIG. 2, the fan blade includes a tip 24, a root 26, a leading edge 28, a trailing edge 30, a pressure surface 32 on a pressure side of the blade and a suction surface 33 on a suction side of the blade. Three directions are defined relative to the blade: a spanwise direction S which extends in a direction from the root to the tip of the blade; a chordwise direction C which extends in a direction from a leading edge to a trailing edge of the blade; and a thickness direction T which extends in a direction from the pressure surface to the suction surface of the blade.

Figure 3:
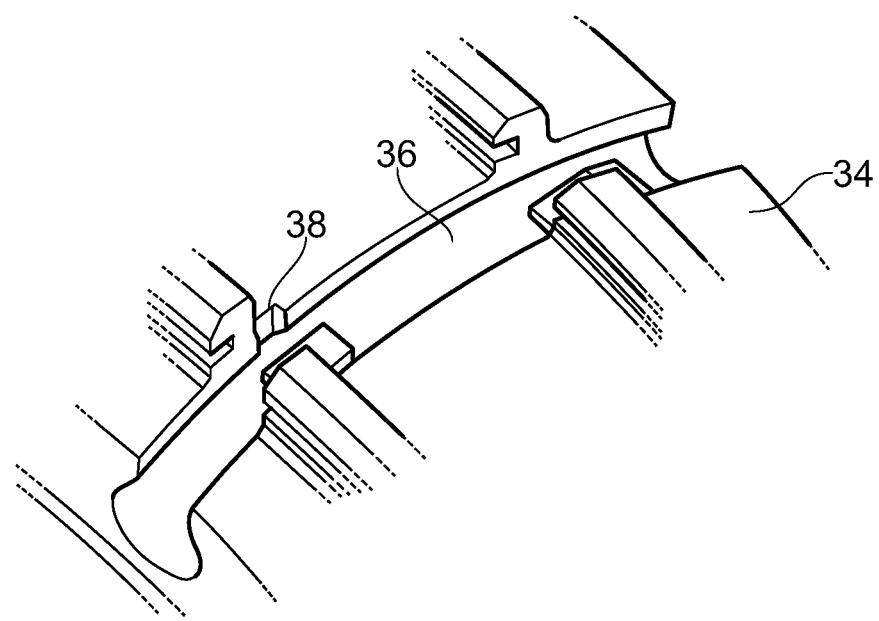
FIG. 3 is a perspective view of a slot on a disc of a fan.

Referring to FIG. 3, the fan disc 34 includes an axially (or chordwise) extending slot 36. In the present example, the slot is dovetail shaped, but may be any suitable shape. The disc also includes a groove 38. The groove 38 extends circumferentially from and away from the slot 36 of the disc. The groove is substantially rectangular in cross section. In the present example the groove is provided proximal to a forward-most position of the fan disc, but generally the groove is provided at a position that corresponds to a retention feature on the blade root that will now be described.

Figure 4:
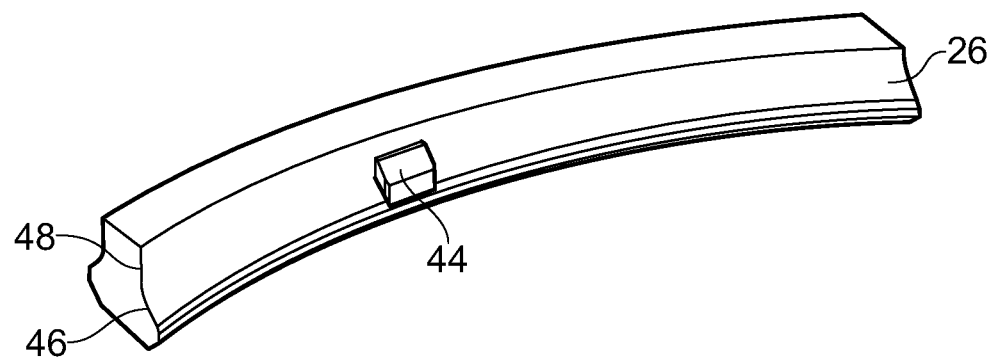
FIG. 4 is a perspective view of a root of a fan blade.

Referring to FIG. 4, the fan blade root 26 may be dovetailed shape. The shape and size of the fan blade root is complimentary to the shape and size of the slot 36 of the disc 34. A retention feature, and in this example an integral retention feature is provided on the blade root. The integral retention feature is a projection 44 that is formed integrally with the fan blade root. The retention feature is provided on a flank 46 of the fan blade root and extends to a section 48 of the blade root that extends in a substantially spanwise (and chordwise) direction.

The projection 44 is substantially rectangular in cross section and includes rounded edges. The transition between the remainder of the root and the projection may define a curved surface. In this way, there are no sharp corners between the projection and the remainder of the fan blade root. In the present example, the projection extends approximately 5 to 10% of the chordwise length of the fan blade root. However, the projection may extend any suitable length.

In FIG. 4, only one projection is shown (i.e. the projection on the pressure side of the blade), but a further projection is provided on the opposite side of the fan blade (i.e. on the suction side of the blade). The projection on the opposite side of the fan blade is provided at the same chordwise position as the projection shown in FIG. 4. Both projections also have the same shape and size. The groove in the disc of FIG. 3 is provided at a location that is aligned with the projection when the blade root is in the disc slot.

Referring to FIGS. 3 and 4, the disc 34 may be formed roughly to shape and size, e.g. by forging, and then the disc may be machined to the desired dimensions and to include the desired features. During this machining process the slots 36 and the grooves 38 can be formed in the disc. The disc can then be post-processed, for example treated for compressive strength using a technique such as deep cold rolling.

The blade root 26 may be machined from solid, and the projection 44 may be defined during this machining process.

The blade root and projection may then be post-processed to improve compressive strength. For example, the blade root and projection may be deep cold rolled.

In use, the fan blade is assembled in a similar manner to that described in relation to the blade and disc of U.S. Pat. No. 5,443,366 which is incorporated herein by reference, but without the need to assemble a retention arrangement to the fan blade root. The fan blade root 26 is received in the fan disc slot 36. The projections 44 are such that they do not interfere with the sides of the fan disc slot whilst the fan blade root is slid into place in the slot of the disc. A spring member and slider, similar to that shown in U.S. Pat. No. 5,443,366 is then used to bias the fan blade root radially outwardly, such that the projections 44 are received in the respective grooves 38 of the fan disc 34.

Gas turbine engines are designed to avoid vibratory failures. The most common types of vibration problems include resonant vibration and flutter. As the person of ordinary skill in the art will recognise, flutter is an aeroelastic instability occurring generally as a non-integral order vibration. In the following described examples, the positioning and/or shape and/or size of the retention feature can be selected to reduce flutter.

To reduce flutter, the present disclosure proposes providing a fan with at least two different sets of fan blades, each set of fan blades having a different arrangement of retention features.

Figure 5:
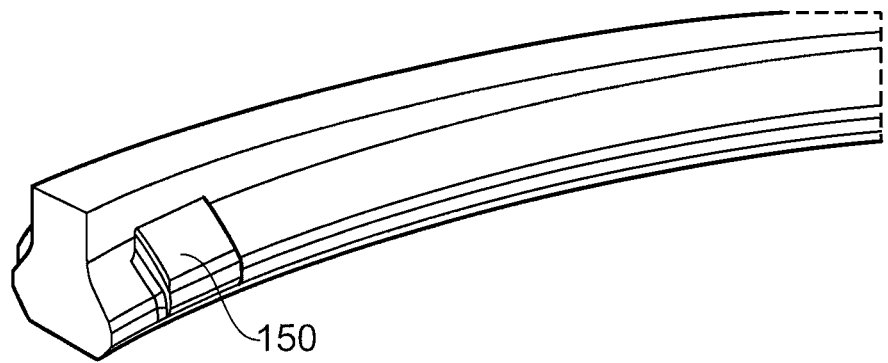
FIG. 5 is a perspective view of a root of a fan blade of a first set of fan blades.
Figure 6:
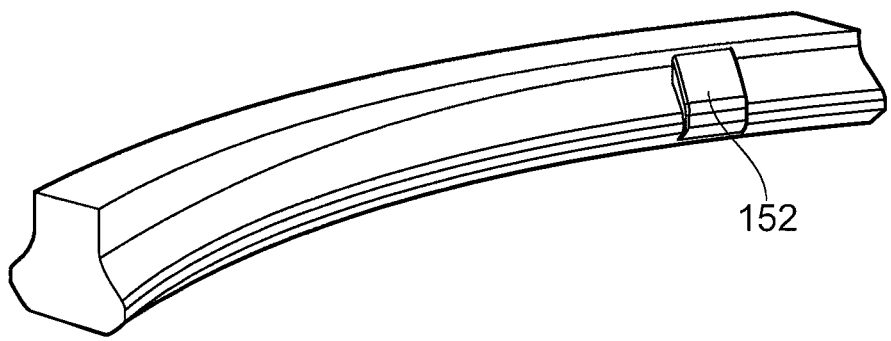
FIG. 6 is a perspective view of a root of a fan blade of a second set of fan blades.

Referring now to FIGS. 5 and 6, in a first example of such a fan, the retention features are projections 150 and 152, similar to the projection 44 previously described. FIG. 5 illustrates the root of a blade from a first set of fan blades. The blades from the first set of fan blades include a projection 150 provided proximal to the leading edge of the fan blade. In this example, the projection 150 is chordally proximal to but spaced from the leading edge. In this example, the projection 150 extends on both the pressure side and the suction side of the blade, similar to the previously described example.

FIG. 6 illustrates the root of a blade from a second set of fan blades that has an arrangement of retention feature(s) different to the first set of fan blades. The blades from the second set of fan blades include a projection 152 provided proximal to the trailing edge of the fan blade. In this example, the projection 152 is chordally proximal to but spaced from the trailing edge. In this example, the projection 152 extends on both the pressure side and the suction side of the blade, similar to the previously described example.

The projection 150 provided proximal to the leading edge of the first set of blades has a greater chordal length than the projection 152 provided proximal to the trailing edge of the second set of fan blades.

Provision of a larger projection 150 proximal to the leading edge can increase the vibration strain energy and reduce the kinetic energy in the region near the leading edge and the root, so as to reduce the 1F mode frequency.

The blades of the first set and the second set are alternated, such that one blade of the second set is provided between two blades of the first set, circumferentially around the fan. The difference in root configuration, i.e. the different position and size of the projections 150, 152 will mistune the fan. This mistuning can be designed to improve flutter stability of the fan.

A further example of how fan blades can be designed and arranged to improve flutter stability will now be described with reference to FIGS. 7 to 10.

Figure 7:
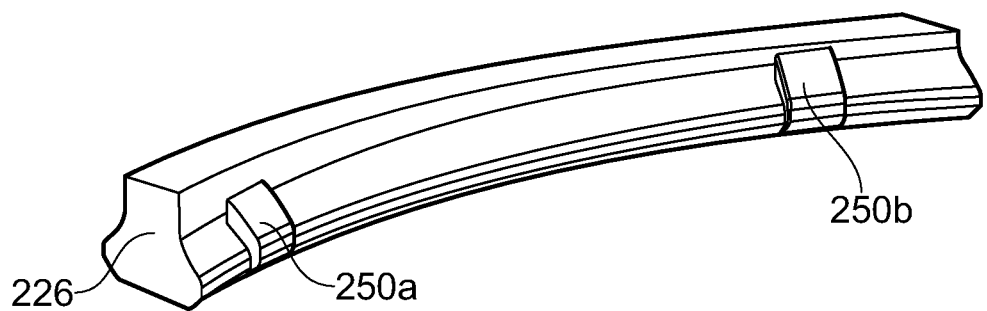
FIGS. 7 and 8 are perspective views of an alternative root of a first set of fan blades.
Figure 8:
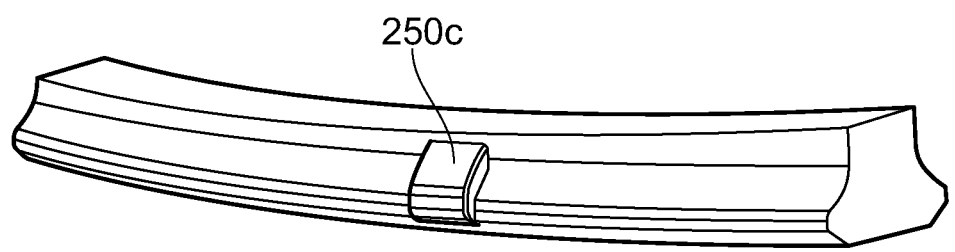

The fan includes a first set of blades with retention features in a first set of locations and a second set of blades with retention features in a second set of locations. Referring to FIGS. 7 and 8, the first set of blades includes two projections 250*a*, 250*b* on a pressure side of the root 226 of the blade and one projection 250*c* on the suction side of the root. In this example, only two projections are provided on the pressure side and only one projection is provided on the suction side of the root.

Referring to FIG. 7, one of the projections 250*a* on the pressure side of the root 226 is provided proximal to the leading edge of the blade. In this example, the projection 250*a* is chordally spaced from a position aligned with the leading edge of the blade. The other projection 250*b* on the pressure side of the root 226 is provided proximal to the trailing edge of the blade. In this example the projection 250*b* is chordally spaced from a position aligned with the trailing edge of the blade. Referring to FIG. 8, the projection 250*c* is provided at a chordal position between that of the two projections on the suction side of the root, and projection 250*c* may be considered to be provided at a mid-position or in a mid-region of the blade root. In the present example, the projections 250*a*, 250*b*, 250*c* are all dimensioned and shaped the same, but in alternative embodiments the dimensions and shape of the projections may be varied.

Figure 9:
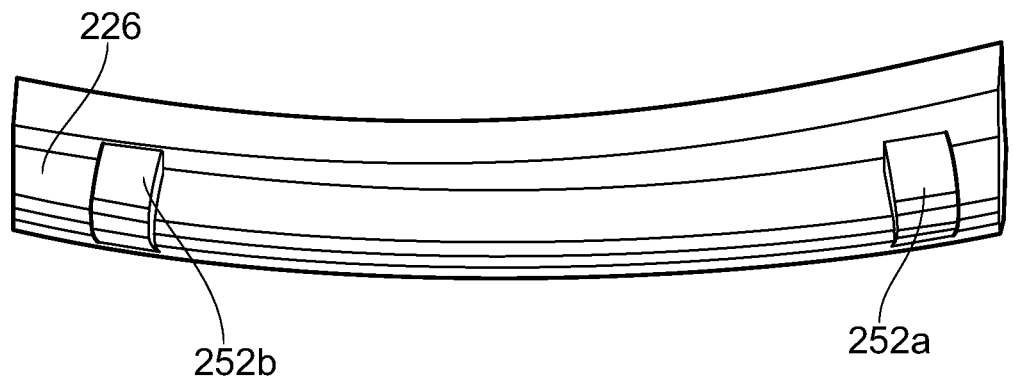
FIGS. 9 and 10 are perspective views of an alternative root of a second set of fan blades.
Figure 10:
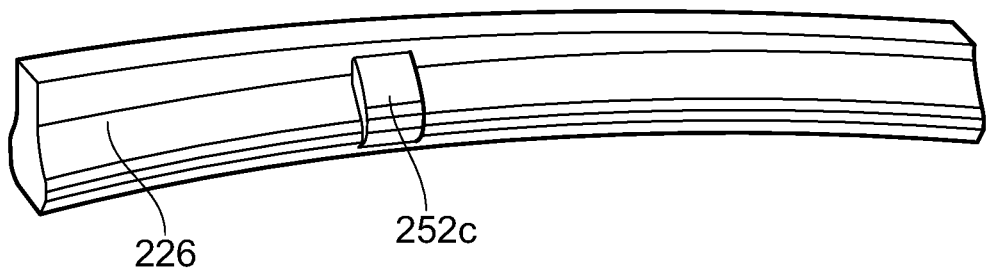

Referring to FIGS. 9 and 10, the second set of blades includes two projections 252*a*, 252*b* on a suction side of the root 226 of the blade and one projection 252*c* on the pressure side of the root. In this example, only two projections are provided on the suction side and only one projection is provided on the pressure side of the root.

Referring to FIG. 9, one of the projections 252*a* on the suction side of the root 226 is provided proximal to the leading edge of the blade. In this example, the projection 252*a* is chordally spaced from a position aligned with the leading edge of the blade. The other projection 252*b* on the suction side of the root 226 is provided proximal to the trailing edge of the blade. In this example the projection 252*b* is chordally spaced from a position aligned with the trailing edge of the blade. Referring to FIG. 10, the projection 252*c* is provided at a chordal position between that of the two projections on the pressure side of the root, and projection 252*c* may be considered to be provided at a mid-position or in a mid-region of the blade root. In this example, the projection 252*c* is provided nearer the leading edge than the trailing edge. In the present example, the projections 252*a*, 252*b*, 252*c* are all dimensioned and shaped the same, but in alternative embodiments the dimensions and shape of the projections may be varied.

Adding different shapes, sizes and/or number of retention features and/or providing the retention features in different locations, can result in different contact pressures at the blade root of the first set of blades compared to the blade root of the second set of blades. This difference in contact pressures can modify the blade to disc interface or friction damping for the first set compared to the second set. The different blade to disc interfaces can result in mistuning which can contribute to improving flutter stability.

The fan has been described as including two different sets of blades, but it may include three or more different sets of blades, each set having blades with a different arrangement of retention features, e.g. a different distribution of retention features or retention features provided at different chordal locations.

The fan has been described as having an alternating distribution of fan blades such that circumferentially one fan blade from the first set is adjacent a fan blade of the second set in a suction side and a pressure side direction (or in both a clockwise and anti-clockwise direction), and one fan blade from the second set is adjacent a fan blade of the first set in a suction side and a pressure side direction (or in both a clockwise and anti-clockwise direction). However, in alternative embodiments, an alternative distribution of fan blades may be provided, for example two or more fan blades of the first set may be circumferentially adjacent to each other, and/or two or more fan blades of the second set may be circumferentially adjacent to each other.

It will be appreciated that the described examples provide exemplary positions of the retention features and/or of the shape and/or size and/or type of retention features, but in alternative embodiments the retention features may be in a different position, have a different shape, be a different size, and/or be a different type of retention feature. For example, in alternative embodiments, the retention feature may be a groove for accommodating a shear key. The shear key may then engage with the groove in the slot. In further examples, one or more of the sets of blades may have a groove in the root for a shear key and the one or more of the other sets of blades may include a protrusion (i.e. an integral shear key).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fan for a gas turbine engine, the fan comprising:
   a first set of fan blades, each of the fan blades of the first set comprising one or more retention features on a pressure side and a suction side of a root of the blade, and wherein more retention features are provided on the pressure side than on the suction side of the blades of the first set;
   a second set of fan blades, each of the fan blades of the second set comprising one or more retention features on a pressure side and a suction side of a root of the blade, and wherein more retention features are provided on the suction side than on the pressure side of the blades of the second set; and,
   the axial retention features of the first set of fan blades and the second set of fan blades each comprise an integrally formed protrusion extending circumferentially or radially from a root of the respective blade, the protrusion having a chord length less than a root chord length of the respective fan blade;
   wherein each of the fan blades is mounted to a disc via a respective disc slot, each respective disc slot comprising a groove, and wherein the protrusion is received in the groove of the respective disc slot.

2. The fan according to claim 1, wherein the first set of fan blades comprises two retention features provided on the pressure side of the blade and one retention feature provided on the suction side of the blade, and wherein the second set of fan blades comprises two retention features provided on the suction side of the blade and one retention feature provided on the pressure side of the blade.

3. The fan according to claim 2, wherein one of the two retention features provided on the pressure side of each of the blades of the first set of blades is provided proximal to a leading edge and the other is provided proximal to a trailing edge, and the one retention feature provided on the suction side of the blade is provided in a mid-region between the leading and trailing edge of the blade; and
   wherein one of the two retention features provided on the suction side of each of the blades of the second set of blades is provided proximal to the leading edge and the other is provided proximal to the trailing edge, and the one retention feature provided on the pressure side of the blade is provided in a mid-region between the leading and trailing edge of the blade.

* * * * *